(12) United States Patent
Yuasa

(10) Patent No.: US 10,712,430 B2
(45) Date of Patent: Jul. 14, 2020

(54) OPTICAL SYSTEM OF LASER SCANNER AND SURVEYING INSTRUMENT

(71) Applicant: TOPCON Corporation, Tokyo-to (JP)

(72) Inventor: Taichi Yuasa, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 448 days.

(21) Appl. No.: 15/647,391

(22) Filed: Jul. 12, 2017

(65) Prior Publication Data

US 2018/0031677 A1 Feb. 1, 2018

(30) Foreign Application Priority Data

Jul. 27, 2016 (JP) .................................. 2016-146927

(51) Int. Cl.
*G01S 7/48* (2006.01)
*G01S 7/481* (2006.01)
*G01C 15/00* (2006.01)
*G01S 17/42* (2006.01)
*G01S 17/08* (2006.01)

(52) U.S. Cl.
CPC .......... *G01S 7/4813* (2013.01); *G01C 15/002* (2013.01); *G01S 7/4811* (2013.01); *G01S 7/4817* (2013.01); *G01S 17/08* (2013.01); *G01S 17/42* (2013.01)

(58) Field of Classification Search
USPC ....................................................... 356/4.01
See application file for complete search history.

(56) References Cited

U.S. PATENT DOCUMENTS

| 5,991,011 | A |   | 11/1999 | Damm |   |
|---|---|---|---|---|---|
| 5,995,233 | A | * | 11/1999 | Ohtomo | G01C 15/006 356/400 |
| 7,474,388 | B2 | * | 1/2009 | Ohtomo | G01C 3/08 356/4.01 |
| 7,751,033 | B2 |   | 7/2010 | Skultety-Betz et al. |   |
| 8,130,368 | B2 | * | 3/2012 | Eno | G01S 7/4813 356/3.01 |
| 8,570,493 | B2 | * | 10/2013 | Mertz | G01C 15/002 356/3.01 |

(Continued)

FOREIGN PATENT DOCUMENTS

| EP | 2653883 A1 | 10/2013 |
| JP | 10-213661 A | 8/1998 |

OTHER PUBLICATIONS

European communication dated Dec. 1, 2017 in corresponding European patent application No. 17181647.3.

*Primary Examiner* — James R Hulka

(74) *Attorney, Agent, or Firm* — Nields, Lemack & Frame, LLC

(57) ABSTRACT

An optical system of a laser scanner comprising: a light projecting system for projecting a distance measuring light, a scanning mirror for rotatably irradiating the distance measuring light from the light projecting system around a single axis and for making a reflected distance measuring light from an object to be measured enter a light receiving system, a transmission window for accommodating the scanning mirror and through which the distance measuring light and the reflected distance measuring light are transmitted, and a correction optical component for offsetting an optical action of the transmission window, which is provided at least in a middle of an irradiating optical path of the distance measuring light.

8 Claims, 4 Drawing Sheets

(56) References Cited

U.S. PATENT DOCUMENTS

| | | | |
|---|---|---|---|
| 8,659,749 B2* | 2/2014 | Bridges | G01S 7/4818 |
| | | | 356/5.13 |
| 2007/0263202 A1* | 11/2007 | Ohtomo | G01C 3/08 |
| | | | 356/4.01 |
| 2008/0123170 A1 | 5/2008 | Reichert et al. | |
| 2009/0052288 A1* | 2/2009 | Eno | G01S 7/4813 |
| | | | 369/53.11 |
| 2011/0032509 A1* | 2/2011 | Bridges | G01S 7/4818 |
| | | | 356/5.13 |
| 2012/0262693 A1* | 10/2012 | Mertz | G01C 15/002 |
| | | | 356/3.01 |

\* cited by examiner

WITHOUT
CYLINDRICAL LENS
$\theta = 0°$

WITHOUT
CYLINDRICAL LENS
$\theta = 90°$

WITH
CYLINDRICAL LENS
$\theta = 0°$

WITH
CYLINDRICAL LENS
$\theta = 90°$

OPTICAL SYSTEM OF LASER SCANNER AND SURVEYING INSTRUMENT

BACKGROUND OF THE INVENTION

The present invention relates to an optical system used in a laser scanner for acquiring point cloud data and a surveying instrument which comprises a function of a laser scanner and a function of a total station.

A laser scanner scans a distance measuring light within a predetermined measurement range, receives a reflection light and acquires point cloud data.

The laser scanner has a scanning mirror rotating around a single axis and is designed so as to reflect the distance measuring light emitted from a distance measuring light source by the scanning mirror, emit to the measurement range, and further scan by a rotation of the scanning mirror.

The scanning mirror normally has a structure of rotating over a total circumference at a high speed and is accommodated in a sealed container for protection. The container has a transmission window made of a cylindrical transparent member, and the distance measuring light is emitted through the transmission window or is received through the transmission window.

Since the transmission window is cylindrical, when the distance measuring light is transmitted through the transmission window, the distance measuring light is subjected to an optical action from the transmission window, the distance measuring light is diffused, and a luminous flux cross-section is largely expanded. For this reason, an irradiating spot diameter of the distance measuring light at an irradiation point becomes large, and a measurement with a high angular resolution becomes impossible. Further, a reflected distance measuring light to be received is also expanded. As a result, there is a problem that a small light receiving element cannot be used, and a dynamic range of a received light amount increases and a measurement accuracy deteriorates.

SUMMARY OF THE INVENTION

It is an object of the present invention is to provide an optical system of a laser scanner which prevents an expansion of a luminous flux of a distance measuring light and projects a distance measuring light with high quality in the laser scanner having a structure that the distance measuring light is irradiated through a transmission window and to provide a surveying instrument which comprises a function of the laser scanner and a function of a total station.

To attain the object as described above, an optical system of a laser scanner according to the present invention comprises a light projecting system for projecting a distance measuring light, a scanning mirror for rotatably irradiating the distance measuring light from the light projecting system around a single axis and for making a reflected distance measuring light from an object to be measured enter a light receiving system, a transmission window for accommodating the scanning mirror and through which the distance measuring light and the reflected distance measuring light are transmitted, and a correction optical component for offsetting an optical action of the transmission window, which is provided at least in a middle of an irradiating optical path of the distance measuring light.

Further, in the optical system of the laser scanner according to the present invention, the correction optical component is provided so that the distance measuring light is transmitted through the correction optical component and enters the scanning mirror.

Further, in the optical system of the laser scanner according to the present invention, the transmission window is formed by a cylindrical curved surface or a conical curved surface and has an optical action for diffusing a luminous flux in a circumferential direction of the curved surface, and wherein the correction optical component has an optical action for converging the luminous flux in the diffusing direction or for diffusing the luminous flux in a direction orthogonal to the diffusing direction.

Further, in the optical system of the laser scanner according to the present invention, the transmission window is a cylindrical body formed by the cylindrical curved surface or the conical curved surface, a reflection surface of the scanning mirror is formed to a concave surface along a circumferential direction of the transmission window or formed to a convex surface along a direction perpendicular to the reflection surface, and the scanning mirror is configured to act as the correction optical component.

Further in the optical system of the laser scanner according to the present invention, the transmission window is designed in such a manner that either one of an outer surface and an inner surface or the both surfaces are formed to a concave surface in a generating line direction of a cylindrical shape, and formed to a toroidal surface by which the luminous flux is diffused in the generating line direction, and wherein the transmission window is configured to act as the correction optical component.

Furthermore, a surveying instrument according to the present invention comprises a total station and a laser scanner, wherein the total station comprises a leveling unit, a frame unit provided on the leveling unit rotatably in a horizontal direction and a telescope unit provided on the frame unit rotatably in a vertical direction and built-in a distance measuring unit and wherein the laser scanner has an optical system of the laser scanner, wherein the optical system of the laser scanner has the scanning mirror provided capable of rotating around a horizontal axis on an upper surface of the frame unit.

According to the present invention, the optical system of the laser scanner comprises a light projecting system for projecting a distance measuring light, a scanning mirror for rotatably irradiating the distance measuring light from the light projecting system around a single axis and for making a reflected distance measuring light from an object to be measured enter a light receiving system, a transmission window for accommodating the scanning mirror and through which the distance measuring light and the reflected distance measuring light are transmitted, and a correction optical component for offsetting an optical action of the transmission window, which is provided at least in a middle of an irradiating optical path of the distance measuring light. As a result, the optical action received from the transmission window when the distance measuring light passes through the transmission window is offset by the correction optical component, a deterioration of a quality of the distance measuring light is prevented, and a measurement accuracy can be improved.

Furthermore, according to the present invention, the surveying instrument comprises a total station and a laser scanner, wherein the total station comprises a leveling unit, a frame unit provided on the leveling unit rotatably in a horizontal direction and a telescope unit provided on the frame unit rotatably in a vertical direction and built-in a distance measuring unit and wherein the laser scanner has an optical system of the laser scanner, wherein the optical system of the laser scanner has the scanning mirror provided capable of rotating around a horizontal axis on an upper surface of the frame unit. As a result, a measurement by the total station and an acquisition of the point cloud data by the laser scanner can be performed without preparing the total station and the laser scanner individually, and further since the laser scanner as mounted may be a uniaxial laser scanner, an instrument cost can be kept low.

BRIEF DESCRIPTION OF THE DRAWINGS

FIG. 4A shows a state where a rotation angle of a scanning mirror is 0°, and FIG. 4B shows a contour map of a profile of the luminous flux cross-section far away when the scanning mirror rotates by 90° from the state shown in FIG. 4A.

FIG. 5B shows a contour map of a profile of a luminous flux cross-section far away in a case where the scanning mirror rotates by 90° from the state shown in FIG. 5A.

DETAILED DESCRIPTION OF THE PREFERRED EMBODIMENT

A description will be given below on an embodiment of the present invention by referring to the attached drawings.

First, by referring to FIG. 1, a description will be given on general features of a total station comprising a laser scanner according to the present invention.

Figure 1:
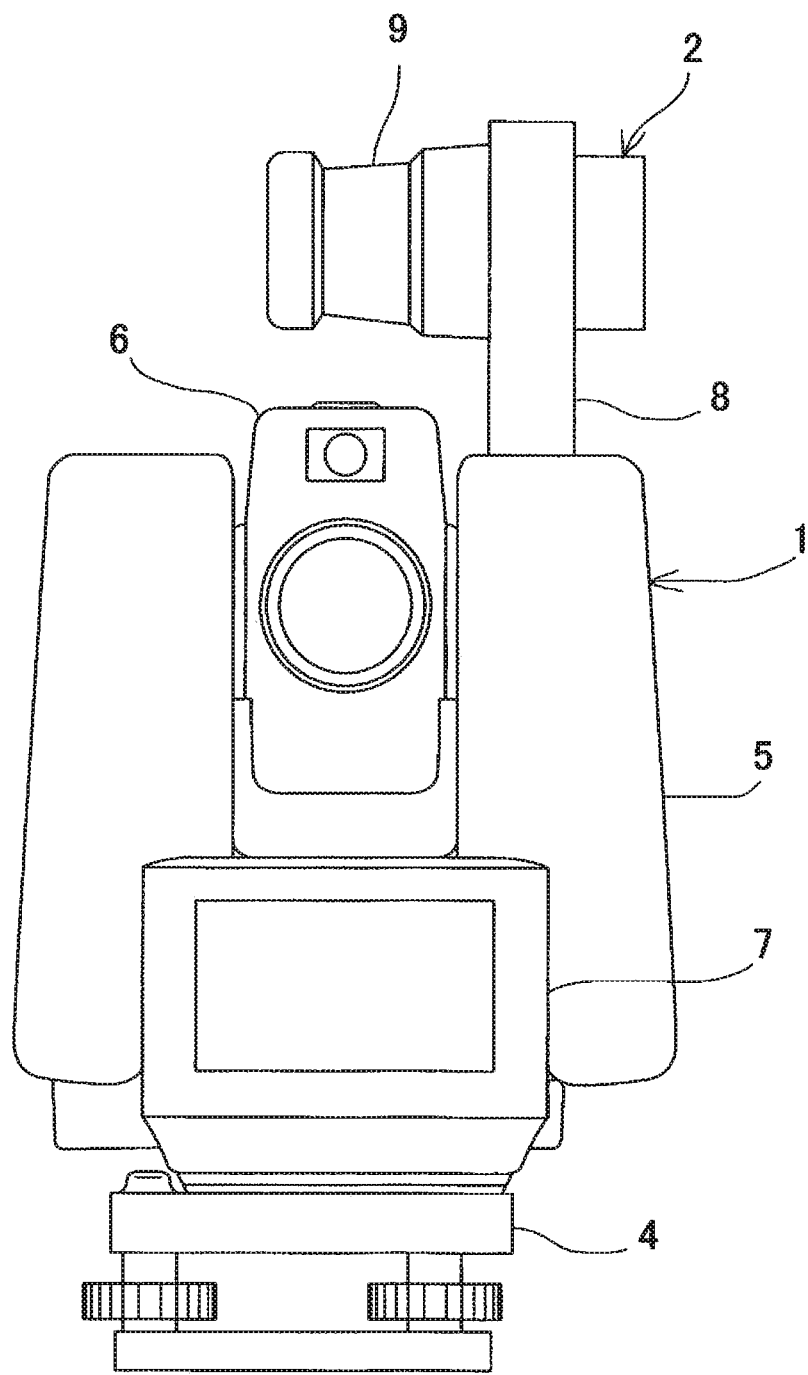
FIG. 1 is an external view of a total station according to an embodiment of the present invention.

In FIG. 1, reference numeral 1 denotes the total station, reference numeral 2 denotes the laser scanner.

The total station 1 comprise a leveling unit 4 for leveling the total station 1, a frame unit 5 installed on the leveling unit 4 and capable of horizontally rotating, a telescope unit 6 provided on the frame unit 5 rotatably in an up and down direction, and an operation unit 7 which serves as a display unit provided on the frame unit 5.

In the frame unit 5, a horizontal rotation driving unit (not shown) for rotating the frame unit 5 in a horizontal direction, a horizontal angle detector (not shown) for detecting a horizontal angle of the frame unit 5, a vertical rotation driving unit (not shown) for rotating the telescope unit 6 in a vertical direction, a vertical angle detector (not shown) for detecting a vertical angle of the telescope unit 6 and a control device (not shown) are accommodated.

In the telescope unit 6, a distance measuring optical unit (not shown) and a distance measuring unit are built-in. The distance measuring unit projects a distance measuring light through the distance measuring optical unit, receives a reflected distance measuring light from an object to be measured through the distance measuring optical unit, and performs a distance measurement of the object to be measured. The control device performs a control of a rotation of the frame unit 5, a control of a rotation of the telescope unit 6 and a control of the distance measuring unit, and executes a three-dimensional measurement of the object to be measured.

The laser scanner 2 is attached on the frame unit 5 via a mounting member 8. It is to be noted that the mounting member 8 may be attachable to or detachable from the frame unit 5 or may be fixedly provided.

The laser scanner 2 is a uniaxial laser scanner and has a cylindrical transmission window 9. A scanning mirror (to be described later) is accommodated inside the transmission window 9, and the scanning mirror rotates over a total circumference around a horizontal axis (to be described later).

The distance measuring light deflected by the scanning mirror is projected through the transmission window 9 and is made to scan over the total circumference in a vertical surface by a rotation of the scanning mirror.

The laser scanner 2 is constituted so that a pulsed light is used, for instance, as the distance measuring light, a distance measurement and a measurement of a vertical angle are performed for each one pulse, and a two-dimensional point cloud data is acquired.

Further, while scanning a uniaxial point cloud data by the laser scanner 2, the frame unit 5 is horizontally rotated and a horizontal angle for each one pulse is obtained. By associating the horizontal angle with a measurement result obtained by the laser scanner 2, three-dimensional point cloud data can be acquired.

Thus, a measurement as the total station can be performed, and by a cooperation between the total station 1 and the laser scanner 2, a measurement as the laser scanner for acquiring the three-dimensional point cloud data can be performed.

Further, although in general, a distance measurement result of the laser scanner has an accuracy poorer than an accuracy of the total station, by correcting the distance measurement result of the laser scanner by a distance measurement result of the total station, a measurement accuracy of the laser scanner can be improved.

As described above, in the laser scanner 2, since the distance measuring light is projected through the transmission window 9, the distance measuring light is subjected to an optical action of the transmission window 9.

In the laser scanner 2 according to the present embodiment, the optical action of the transmission window 9 is suppressed, and an expansion of a luminous flux is prevented.

Figure 2:
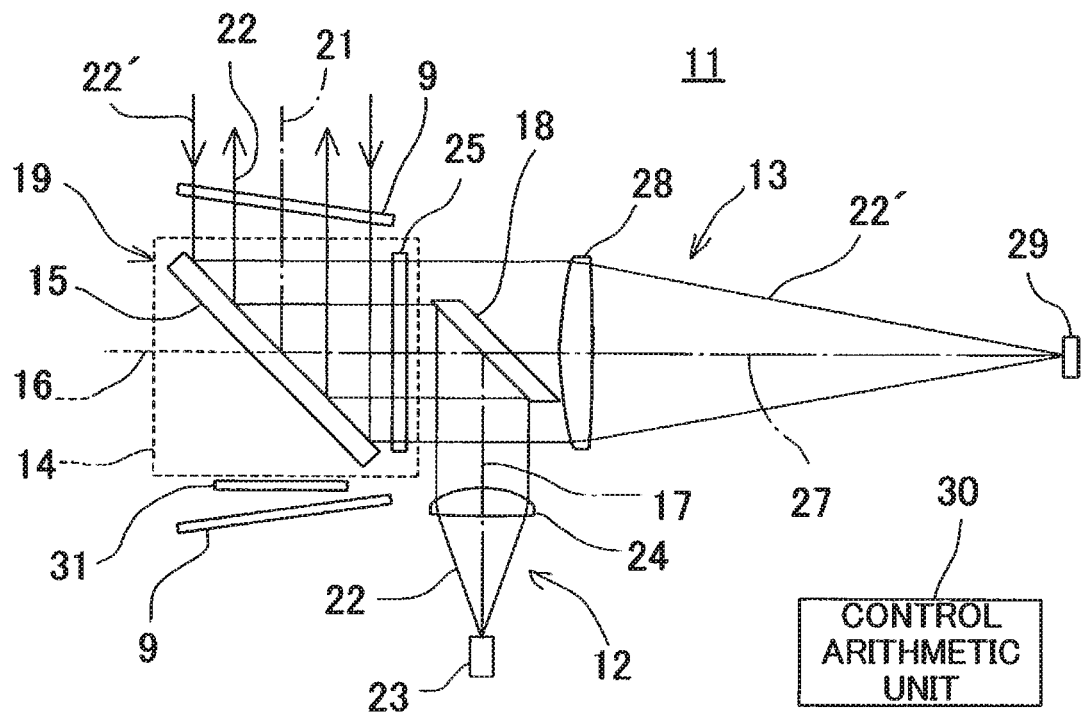
FIG. 2 is a schematical block diagram of an optical system of a laser scanner according to a first embodiment of the present invention.

FIG. 2 shows an optical system 11 of the laser scanner according to a first embodiment.

The optical system 11 of the laser scanner mainly has a light projecting system 12, a light receiving system 13 and a rotary irradiating unit 19. In FIG. 2, the rotary irradiating unit 19 has a scanning mirror 15 and a mirror holder 14 for holding the scanning mirror 15 and is supported rotatably around a horizontal axis 16.

Further, in FIG. 2, reference numeral 9 denotes a transmission window in a substantially cylindrical shape, and a section of the transmission window 9 is shown. The transmission window 9 tilts with respect to a distance measuring optical axis 21 (to be described later) and is constituted by a truncated conical curved surface by taking a reflection in the transmission window 9 into consideration. It is to be noted that the cylindrical shape here is assumed to include shapes which form a hollow cylindrical body by a cylindrical curved surface, a conical curved surface and the like.

The light projecting system 12 has a light projecting optical axis 17, and the light projecting optical axis 17 is deflected by a light projecting mirror 18 which is a first deflecting component and the scanning mirror 15 which is a second deflecting component by 90°, respectively. The scanning mirror 15 deflects the light projecting optical axis 17 at a right angle with respect to the horizontal axis 16. The light projecting optical axis 17 deflected by the scanning mirror 15 is transmitted through the transmission window 9 as the distance measuring optical axis 21 and is extended toward the object to be measured.

The scanning mirror 15 functions as a rotary irradiating unit for scanning the distance measuring light 22 by a rotation and also functions as a deflecting unit for deflecting the distance measuring light 22 to a direction of the object to be measured and deflecting a reflected distance measuring light 22' so as to enter the light receiving system 13.

On the light projecting optical axis 17, a light emitting element 23 which emits a distance measuring light 22 of a visible light or an invisible light such as a laser diode or the like, for instance, a collimator lens 24 which makes the distance measuring light 22 emitted from the light emitting element 23 a parallel luminous flux, and a correction optical component 25 disposed between the light projecting mirror 18 and the scanning mirror 15 are provided.

The light projecting system 12 makes the distance measuring light 22 emitted by the light emitting element 23 enter the scanning mirror 15.

The light receiving system 13 has a light receiving optical axis 27. The light receiving optical axis 27 passes through the light projecting mirror 18, coincides with the light projecting optical axis 17 deflected by the light projecting mirror 18, and further is deflected by the scanning mirror 15 and coincides with the distance measuring optical axis 21.

On the light receiving optical axis 27, the scanning mirror 15, the correction optical component 25, an image forming lens 28, and a light receiving element 29 are disposed from an object side. The light receiving system 13 leads the reflected distance measuring light 22' deflected by the scanning mirror 15 to the light receiving element 29 and makes the reflected distance measuring light 22' focus on the light receiving element 29.

The transmission window 9 has a curved surface and thus, has an optical action. The correction optical component 25 is formed so as to exert an opposite optical action for offsetting the optical action with respect to the transmission window 9.

The scanning mirror 15 and the correction optical component 25 are optical components common to the light projecting system 12 and the light receiving system 13. Further, as a light receiving element used as the light receiving element 29, a photodiode, an avalanche photodiode (APD) or the like is used, for instance.

It is to be noted that the scanning mirror 15 may be an optical component having a function as a deflecting optical component such as a reflection rectangular prism, a pentaprism and the like. Further, it would suffice if a position where the correction optical component 25 is provided is a position where the optical action of the transmission window 9 is offset in optical paths of the distance measuring light and the reflected distance measuring light, and the correction optical components 25 may be provided between the transmission window 9 and the scanning mirror 15, for instance.

A reference mirror 31 is provided at a position not interfering with rotations of the scanning mirror 15 and the mirror holder 14, so as to confront a reflection surface of the scanning mirror 15 at a rotation position as required of the scanning mirror 15. The reference mirror 31 is arranged in parallel with the light receiving optical axis 27. Further, the reference mirror 31 may be a reflection sheet, a scattering component, a reflection prism sheet and the like.

An installation position of the reference mirror 31 is set at a position not affecting an acquisition of the point cloud data. For instance, in FIG. 1, the total station 1 is positioned below the laser scanner 2, and the point cloud data cannot be acquired in a range shaded by the total station 1. The reference mirror 31 is provided at a portion shaded by the total station 1.

When the scanning mirror 15 is rotated, and the reflection surface of the scanning mirror 15 and the reference mirror 31 face to each other, the distance measuring light 22 reflected by the scanning mirror 15 enters the reference mirror 31 and is reflected by the reference mirror 31. Further, the distance measuring light 22 is reflected by the scanning mirror 15 and is focused by the image forming lens 28 on the light receiving element 29.

In this case, the light projecting mirror 18, the scanning mirror 15, the reference mirror 31, the correction optical component 25, and the image forming lens 28 constitute an internal reference optical system.

A rotation of the scanning mirror 15 (the mirror holder 14) and a light emission of the light emitting element 23 are controlled by a control arithmetic unit 30, and a light receiving signal of the light emitting element 29 is input to the control arithmetic unit 30 and the distance is calculated. Further, a vertical angle at a distance measurement is also detected, and the distance measurement result and the vertical angle are associated with each other by the control arithmetic unit 30. Thus, the two-dimensional point cloud data is acquired by the laser scanner 2. Further, the two-dimensional point cloud data is sent to a control device of the total station 1.

A description will be given on an action of the optical system 11 of the laser scanner.

The distance measuring light 22 emitted from the light emitting element 23 is made to a parallel luminous flux by the collimator lens 24 and then, is reflected by the light projecting mirror 18, is transmitted through the correction optical component 25, is reflected by the scanning mirror 15 and is projected through the transmission window 9.

By transmitting the distance measuring light 22 through the transmission window 9, the distance measuring light 22 is subjected to the optical action from the transmission window 9 and is deteriorated in such a manner that a luminous flux form is expanded in one direction or the like, but the correction optical component 25 offsets the optical action of the transmission window 9. Therefore, the distance measuring light 22 being transmitted through the transmission window 9 is projected remaining in a state where the distance measuring light 22 is made to the parallel luminous flux by the collimator lens 24.

The reflected distance measuring light 22' reflected from the object to be measured enters through the transmission window 9, is reflected by the scanning mirror 15, is transmitted through the correction optical component 25, and is focused by the image forming lens 28 on the light receiving element 29.

By rotating the scanning mirror 15 over the total circumference, the distance measuring light 22 is scanned, and uniaxial point cloud data is acquired.

In a scanning process of the distance measuring light 22, the distance measuring light 22 enters the reference mirror 31 as an internal reference light, and the internal reference light is reflected by the reference mirror 31. Further, the internal reference light is reflected by the scanning mirror 15, is transmitted through the correction optical component 25, and is focused by the image forming lens 28 on the light receiving element 29.

It is to be noted that although the internal reference light is also transmitted through the correction optical component 25, it would suffice if a part of a luminous flux of the internal reference light is received, and an influence of the correction optical component 25 does not occur.

Since a time difference between a light receiving timing of the reflected distance measuring light 22' and a light receiving timing of the internal reference light is a time for reciprocating of the distance measuring light 22 to the object to be measured, a distance to the object to be measured can be measured by the time difference and a light velocity. Further, by obtaining a time difference between the light receiving timing of the reflected distance measuring light 22' and the light receiving timing of the internal reference light, an error factor such as a drift of a distance measuring circuit (not shown) and the like is offset, and a distance measurement with high accuracy becomes possible.

Further, since a deterioration of the luminous flux form of the distance measuring light 22 is suppressed by the correction optical component 25, the distance measurement with higher accuracy becomes possible.

Figure 3:
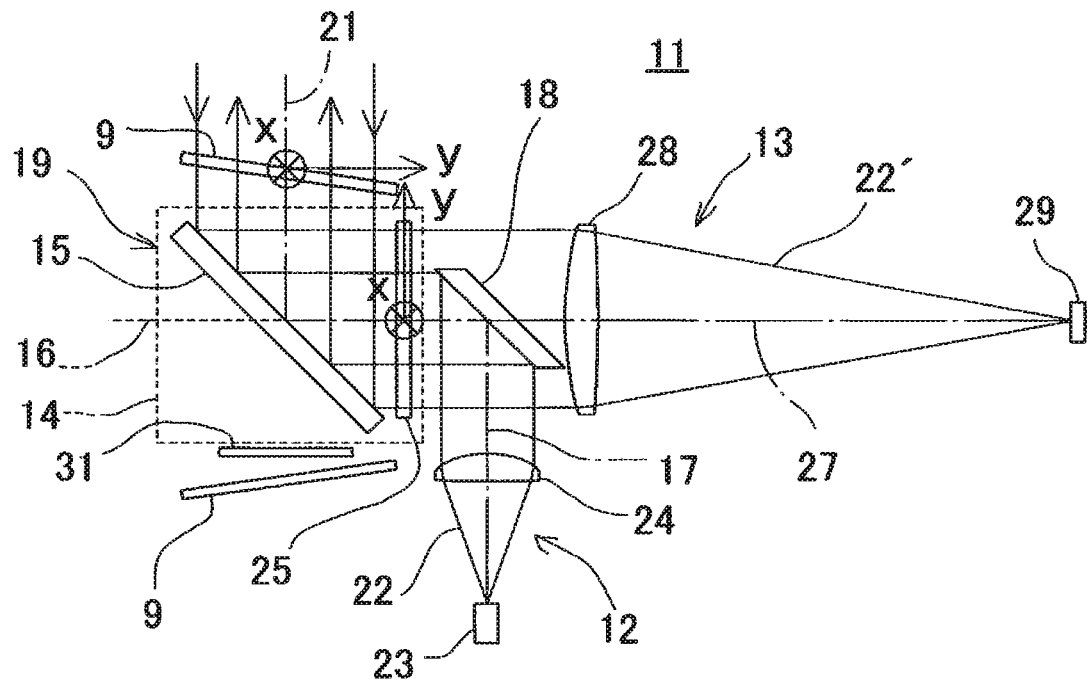
FIG. 3 is a schematical block diagram to show an optical action of the first embodiment.

By referring to FIG. 3, a description will be give on optical actions of the correction optical component 25 and the transmission window 9.

It is to be noted that, in FIG. 3, what are equivalent to components as shown in FIG. 2 are referred by the same symbol, and detailed description thereof will not be given here.

In FIG. 3, in two orthogonal axes orthogonal to the light projecting optical axis 17 (the distance measuring optical axis 21), an axis in a direction perpendicular with respect to a paper surface of FIG. 3 is assumed to be an x-axis, and an axis in a direction parallel with respect to the paper surface is assumed to be a y-axis.

The transmission window 9 exerts the optical action that the luminous flux is diffused to the x-axis direction, and an astigmatic difference occurs.

Therefore, it would suffice if the correction optical component 25 exerts the optical action of converging the luminous flux in the x-axis direction (in a circumferential direction of a cylindrical curved surface) or of diffusing the luminous flux in the y-axis direction (in a generating line direction of the cylindrical curved surface) and solves the astigmatic difference.

As the correction optical component 25, an anamorphic optical element (cylindrical lens) is used as an optical component with such an optical action.

For instance, the optical action for offsetting the optical action of the transmission window 9 can be realized by either of making the x-axis direction of the cylindrical lens a convex surface or making the y-axis direction a concave surface.

It is to be noted that a radius of curvature may be given to either of a front surface or a rear surface of the cylindrical lens. Further, the radius of curvature may be given to the both surfaces and a comprehensive correction may be performed.

Figure 4A:
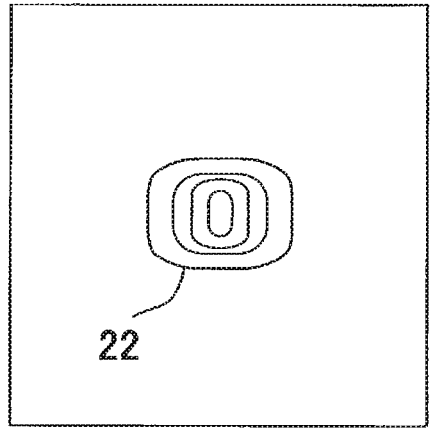
FIG. 4A and FIG. 4B show contour maps of profiles of luminous flux cross-sections far way a distance measuring light in a case where a correction is not performed.
Figure 4B:
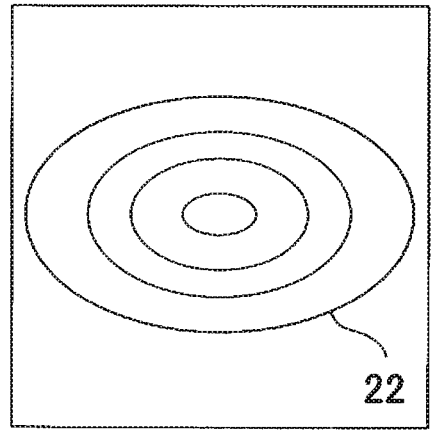

FIG. 4A and FIG. 4B both show cases where there is no correction optical component 25 and show a contour map of a profile of a luminous flux cross-sectional shape far away the distance measuring light 22 as transmitted through the transmission window 9 and subjected to the optical action.

Further, FIG. 4A shows a contour map of a profile of a luminous flux cross-sectional shape far away in a case where a longitudinal direction of a shape of a light source and a diffusing direction of the transmission window 9 is in a relation of 90° ($\theta=0°$), and FIG. 4B shows a contour map of a profile of the luminous flux cross-sectional shape far away in a case where the longitudinal direction of the shape of the light source and the diffusing direction of the transmission window 9 is in the relation of 0° ($\theta=90°$).

Figure 5A:
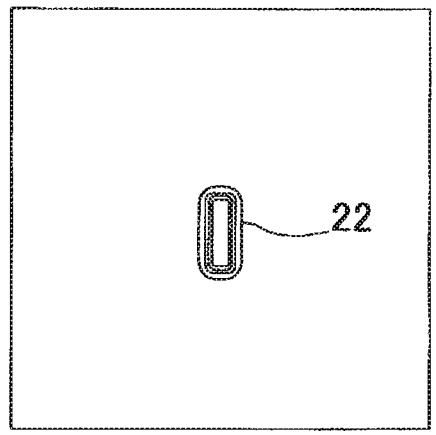
FIG. 5A and FIG. 5B show contour maps of profiles of luminous flux cross-sections far away the distance measuring light when the correction is performed by a correction optical component, FIG. 5A show a contour map of a profile of a luminous flux cross-section far away in which the rotation angle of the scanning mirror is 0°.
Figure 5B:
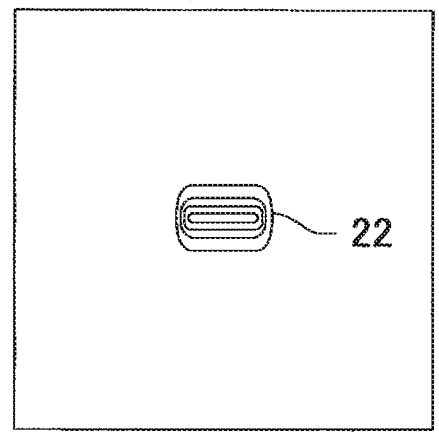

FIG. 5A and FIG. 5B both show cases where the correction optical component 25 is provided and show a contour map of a profile of the luminous flux cross-sectional shape far away the distance measuring light 22 after the optical action of the transmission window 9 is offset.

Further, FIG. 5A and FIG. 5B correspond to FIG. 4A and FIG. 4B, respectively and show the contour maps of the profiles of the luminous flux cross-sectional shapes far away, and it can be known that the cross-sectional shape of the luminous flux is largely improved by providing the correction optical component 25.

Figure 6:
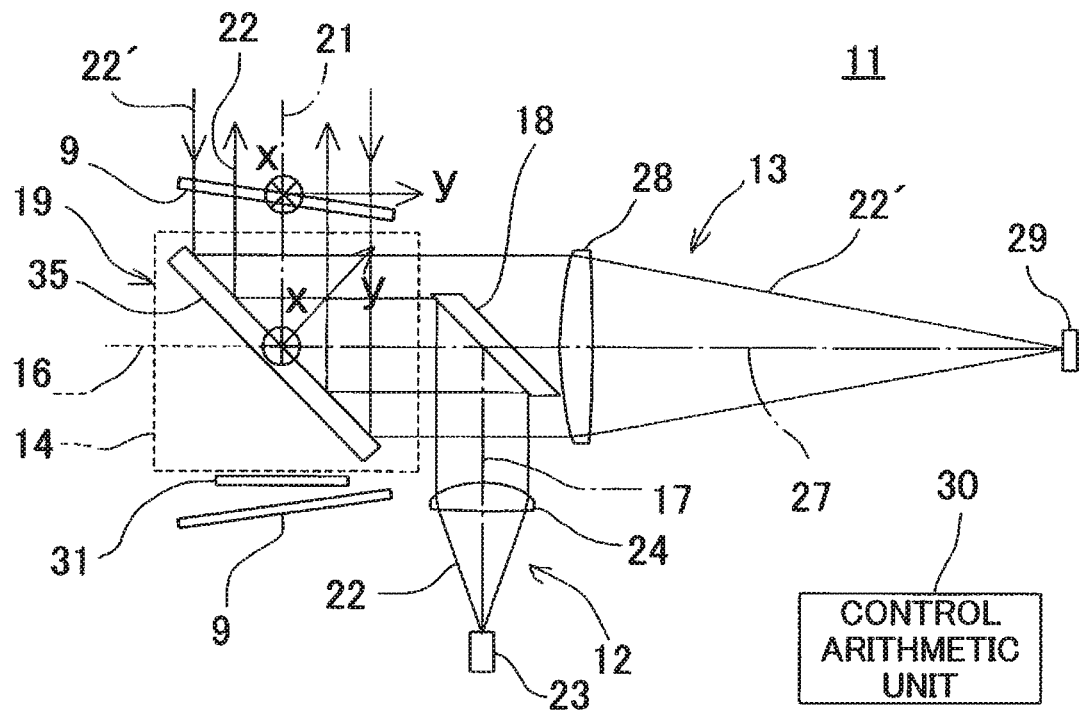
FIG. 6 is a schematical block diagram of an optical system of a laser scanner according to a second embodiment of the present invention.

FIG. 6 shows an optical system 11 of the laser scanner according to the second embodiment.

It is to be noted that, in FIG. 6, what are equivalent to components as shown in FIG. 2 are referred by the same symbol, and detailed description thereof will not be given here.

In the second embodiment, a correction optical component 25 used in the first embodiment is omitted, and a scanning mirror 35 to which a correction optical action is added is used.

The scanning mirror 35 is an anamorphic reflection optical element, for instance a cylindrical mirror.

A description will be given on optical actions of a transmission window 9 and the scanning mirror 35.

Regarding the transmission window 9, in two orthogonal axes orthogonal to a distance measuring optical axis 21, an axis perpendicular with respect to a paper surface is assumed to be an x-axis, and an axis in parallel with the paper surface is assumed to be a y-axis.

Further, regarding the scanning mirror 35, in two orthogonal axes orthogonal to a distance measuring optical axis 21, an axis perpendicular with respect to a paper surface is assumed to be an x-axis, and an axis perpendicular to the reflection surface of the scanning mirror 35 is assumed to be a y-axis.

The transmission window 9 exerts an action that a luminous flux is diffused in the x-axis direction (in a circumferential direction of a cylindrical curved surface), and an astigmatic difference occurs. The scanning mirror 35 has an optical action of converging the luminous flux in the x-axis direction or of diffusing the luminous flux in the y-axis direction, offsets the optical action of the transmission window 9, and solves the astigmatic difference.

Therefore, the reflection surface of the scanning mirror 35 is formed to a concave surface along the x-axis direction or to a convex surface along the y-axis direction.

Figure 7:
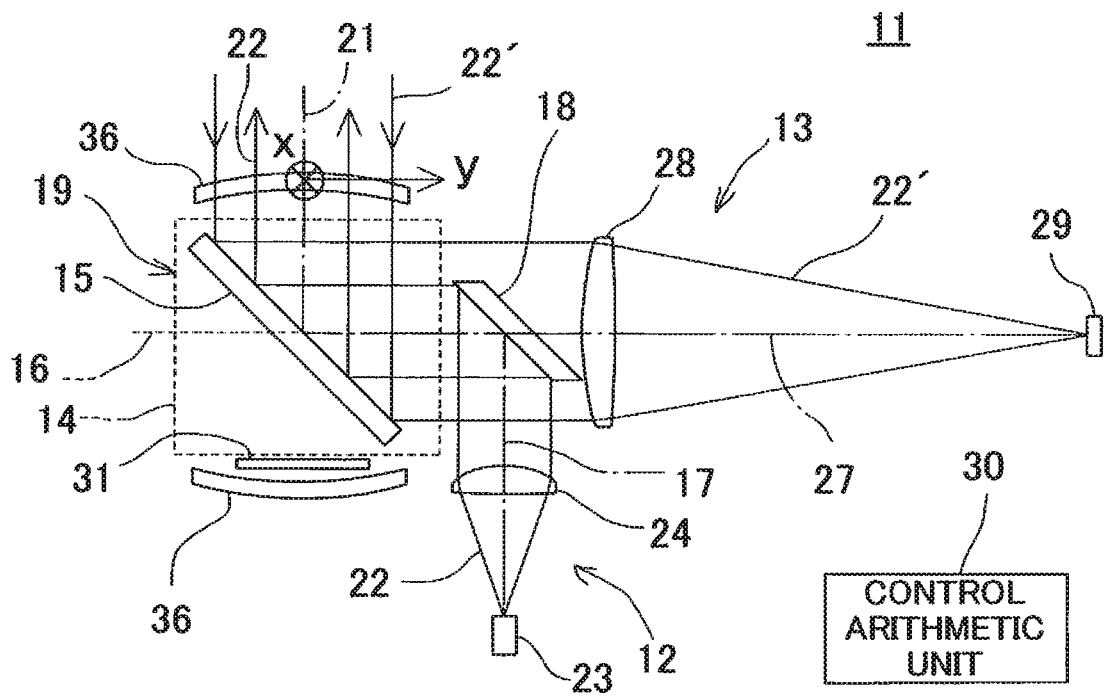
FIG. 7 is a schematical block diagram of an optical system of a laser scanner according to a third embodiment of the present invention.

FIG. 7 shows an optical system 11 of a laser scanner according to a third embodiment.

It is to be noted, in FIG. 7, what are equivalent to components as shown in FIG. 2 are referred by the same symbol, and detailed description thereof will not be given here.

In the third embodiment, a correction optical component 25 used in the first embodiment is omitted, and it is so constituted that a correction optical action is added to a transmission window 36.

Regarding the transmission window 36, in two orthogonal axes orthogonal to a distance measuring optical axis 21, an axis perpendicular with respect to a paper surface is assumed to be an x-axis, and an axis in parallel with respect to the paper surface is assumed to be a y-axis.

Assuming that the transmission window 36 has a cylindrical curved surface or a conical curved surface, the transmission window 36 exerts an action that the luminous flux is diffused in the x-axis direction (in a circumferential direction), and the astigmatic difference occurs.

The transmission window 36 is formed in a curved surface so as to offset the optical action in a case of the cylindrical curved surface or the conical curved surface.

For instance, the transmission window 36 is designed in a toroidal surface which has an action that the luminous flux is diffused in the y-axis direction and solves the astigmatic difference.

Specifically, either one of the front surface and the rear surface of the transmission window 36 is formed to a toroidal surface with a concave surface in the y-axis direction. Alternatively, the front surface and the rear surface of the transmission window 36 are formed as a surface with a negative power in the y-axis direction so as to comprehensively diffuse the luminous flux in the y-axis direction.

Thus, the transmission window 36 does not occur the astigmatic difference with respect to the distance measuring light 22, and in a case where the distance measuring light 22 is projected through the transmission window 36, the distance measuring light 22 is not diffused by the transmission window 36. Further, in a case where the reflected distance measuring light 22' enters through the transmission window 36, the reflected distance measuring light 22' is received without being diffused by the transmission window 36, and a measurement accuracy can be improved.

It is to be noted that in the optical system 11 of the laser scanner, in the embodiments as described above, although the light projecting system 12 and the light receiving system 13 are arranged so as to have the distance measuring optical axis 21 in common, it may be so arranged that the light receiving optical axis 27 is separated from the distance measuring optical axis 21, and the reflected distance measuring light 22' is received by the light receiving system 13 separated from the light projecting system 12.

In this case, correction optical components may be provided in rotary units corresponding to the light projecting system 12 and the light receiving system 13, respectively, or may be provided in a rotary unit corresponding to the light projecting system 12 or in a rotary unit corresponding to the light receiving system 13.

Further, the correction optical component 25 of the optical system 11 of the laser scanner is not one optical component common for the light projecting system 12 and the light receiving system 13 but the correction optical component 25 may be an optical component combining an optical component optimized corresponding to the light projecting system 12 and an optical component optimized corresponding to the light receiving system 13.

The invention claimed is:

1. An optical system of a laser scanner comprising: a light projecting system for projecting a distance measuring light, a scanning mirror for rotatably irradiating said distance measuring light from said light projecting system around a single axis and for making a reflected distance measuring light from an object to be measured enter a light receiving system, a transmission window for accommodating said scanning mirror and through which said distance measuring light and said reflected distance measuring light are transmitted, a correction optical component which is provided on an irradiating optical path of said distance measuring light and is provided at a position where an optical action of said transmission window is offset, and a reference mirror which is provided at a position not affecting an acquisition of point cloud data and confronts said scanning mirror, wherein said transmission window is formed by a cylindrical curved surface or a conical curved surface and has an optical action for diffusing a luminous flux in a circumferential direction of the curved surface, and said correction optical component has an optical action for converging the luminous flux in said diffusing direction or for diffusing the luminous flux in a direction orthogonal to said diffusing direction, and wherein said scanning mirror rotates over a total circumference around a horizontal axis and deflects said distance measuring light from said light projecting system at a right angle with respect to said horizontal axis, and said scanning mirror makes said distance measuring light reflected by said reference mirror enter said light receiving system as an internal reference light.

2. The optical system of the laser scanner according to claim 1, wherein said correction optical component is provided so that said distance measuring light is transmitted through said correction optical component and enters said scanning mirror.

3. A surveying instrument comprising: a total station and a laser scanner, wherein said total station comprises a leveling unit, a frame unit provided on said leveling unit rotatably in a horizontal direction and a telescope unit provided on said frame unit rotatably in a vertical direction and built-in a distance measuring unit, wherein said laser scanner is attached on said frame unit, and said laser scanner has an optical system of said laser scanner of claim 2, and wherein said reference mirror is provided at a portion shaded by said total station.

4. The optical system of the laser scanner according to claim 1, wherein a reflection surface of said scanning mirror is formed to a concave surface along a circumferential direction of said transmission window or formed to a convex surface along a direction perpendicular to the reflection surface, and said scanning mirror is configured to act as said correction optical component.

5. A surveying instrument comprising: a total station and a laser scanner, wherein said total station comprises a leveling unit, a frame unit provided on said leveling unit rotatably in a horizontal direction and a telescope unit provided on said frame unit rotatably in a vertical direction and built-in a distance measuring unit, wherein said laser scanner is attached on said frame unit, and wherein said laser scanner has an optical system of said laser scanner of claim 4, and wherein said reference mirror is provided at a portion shaded by said total station.

6. A surveying instrument comprising: a total station and a laser scanner, wherein said total station comprises a leveling unit, a frame unit provided on said leveling unit rotatably in a horizontal direction and a telescope unit provided on said frame unit rotatably in a vertical direction and built-in a distance measuring unit, wherein said laser scanner is attached on said frame unit, and said laser scanner has an optical system of said laser scanner of claim 1, and wherein said reference mirror is provided at a portion shaded by said total station.

7. The optical system of the laser scanner according to claim 1, wherein said transmission window is designed in such a manner that either one of an outer surface and an inner surface or the both surfaces are formed to a toroidal surface, and wherein said toroidal surface is configured to act as said correction optical component for offsetting said optical action.

8. A surveying instrument comprising: a total station and a laser scanner, wherein said total station comprises a leveling unit, a frame unit provided on said leveling unit rotatably in a horizontal direction and a telescope unit provided on said frame unit rotatably in a vertical direction and built-in a distance measuring unit, wherein said laser scanner is attached on said frame unit, and wherein said laser scanner has an optical system of said laser scanner of claim 7, and wherein said reference mirror is provided at a portion shaded by said total station.

* * * * *